United States Patent
McMahan et al.

(10) Patent No.: US 8,398,090 B2
(45) Date of Patent: Mar. 19, 2013

(54) SPRING LOADED SEAL ASSEMBLY FOR TURBINES

(75) Inventors: Kevin Weston McMahan, Greer, SC (US); Mehmet Demiroglu, Troy, NY (US); Timur Rustamovich Repikov, Moscow (RU)

(73) Assignee: General Electric Company, Schenectady, NY (US)

( * ) Notice: Subject to any disclaimer, the term of this patent is extended or adjusted under 35 U.S.C. 154(b) by 309 days.

(21) Appl. No.: 12/797,272

(22) Filed: Jun. 9, 2010

(65) Prior Publication Data

US 2011/0304104 A1    Dec. 15, 2011

(51) Int. Cl.
*F16J 15/02* (2006.01)

(52) U.S. Cl. .......................... 277/644; 277/643

(58) Field of Classification Search .................. 277/644, 277/643
See application file for complete search history.

(56) References Cited

U.S. PATENT DOCUMENTS

| | | |
|---|---|---|
| 3,975,114 A | 8/1976 | Kalkbrenner |
| 5,099,886 A * | 3/1992 | Squirrell ........................ 137/856 |
| 5,118,120 A * | 6/1992 | Drerup et al. .................. 277/628 |
| 5,125,796 A | 6/1992 | Cromer |
| 5,221,096 A | 6/1993 | Heldreth et al. |
| 5,265,412 A | 11/1993 | Bagepalli et al. |
| 5,474,306 A | 12/1995 | Bagepalli et al. |
| 5,509,669 A | 4/1996 | Wolfe et al. |
| 5,657,998 A | 8/1997 | Dinc et al. |
| 5,709,388 A | 1/1998 | Skinner et al. |
| 5,709,530 A * | 1/1998 | Cahill et al. ................ 415/170.1 |
| 5,797,723 A * | 8/1998 | Frost et al. .................. 415/174.2 |
| 5,915,697 A | 6/1999 | Bagepalli et al. |
| 6,070,605 A | 6/2000 | Steenburgh |
| 6,162,014 A * | 12/2000 | Bagepalli et al. .......... 415/170.1 |
| 6,206,629 B1 | 3/2001 | Reluzco et al. |
| 6,402,466 B1 | 6/2002 | Burdgick et al. |
| 6,418,727 B1 | 7/2002 | Rice et al. |
| 6,431,555 B1 * | 8/2002 | Schroder et al. .............. 277/628 |
| 6,682,300 B2 | 1/2004 | Bolms |
| 6,733,234 B2 | 5/2004 | Paprotna et al. |
| 6,808,179 B1 | 10/2004 | Bhattacharyya et al. |
| 6,883,807 B2 | 4/2005 | Smed |
| 7,101,147 B2 | 9/2006 | Balsdon |
| 7,334,800 B2 | 2/2008 | Minnich |
| 7,572,099 B2 | 8/2009 | Addis |
| 8,142,142 B2 * | 3/2012 | Zborovsky et al. ........... 415/185 |
| 2003/0039542 A1 | 2/2003 | Cromer |
| 2009/0072497 A1 * | 3/2009 | Kunitake et al. .............. 277/641 |

* cited by examiner

*Primary Examiner* — Vishal Patel
*Assistant Examiner* — Nicholas L Foster
(74) *Attorney, Agent, or Firm* — Dority & Manning, P.A.

(57) ABSTRACT

A spring loaded seal assembly is disclosed for sealing a gap between adjacent turbine components. The seal assembly may generally include a turbine seal and a spring member. The turbine seal may extend between the adjacent turbine components and may be configured to seal the gap defined between the turbine components. The spring member may be configured to engage the turbine seal so as to maintain the seal in sealing engagement with the adjacent turbine components.

14 Claims, 7 Drawing Sheets

SPRING LOADED SEAL ASSEMBLY FOR TURBINES

FIELD OF THE INVENTION

The present subject matter relates generally to turbine seals for turbine assemblies and particularly to a spring loaded seal assembly for sealing a gap between adjacent turbine components.

BACKGROUND OF THE INVENTION

Turbine assemblies may include, without limitation, turbine sections of steam turbines and compressor and/or turbine sections of gas turbines. A steam turbine has a steam path which typically includes a steam inlet, a turbine and a steam outlet. A gas turbine has a gas path which typically includes an air intake (or inlet), a compressor, a combustor, a turbine and a gas outlet (or exhaust nozzle). Gas or steam leakage, either out of the gas or steam path or into the gas or steam path, from an area of higher pressure to an area of lower pressure is generally undesirable. For example, gas-path leakage in the turbine or compressor area of a gas turbine, between the rotor of the turbine or compressor and the circumferentially surrounding turbine or compressor casing, will lower the efficiency of the gas turbine leading to increased fuel costs. Additionally, gas-path leakage in the combustor section of a gas turbine will require an increase in burn temperature to maintain the power level, with such increased burn temperatures leading to increased emissions, such as increased NOx production. Further, steam-path leakage in the turbine area of a steam turbine, between the rotor of the turbine and the circumferentially surrounding casing, will lower the efficiency of the steam turbine leading to increased fuel costs.

Turbine seals are typically used to minimize the leakage of fluids in a turbine assembly. As is generally known, side or spline seals may often be utilized for sealing gaps between adjacent turbine components. For example, elongated metallic cloth seals are known for sealing the sides between adjacent turbine components, such as circumferentially-adjacent transition pieces. However, such seals are typically pressure loaded only, relying primarily on high pressure fluids, such as compressor discharge air, contacting a high pressure side of the turbine seal to maintain the seal in sealing engagement with the adjacent turbine components. With regard to pressure loaded seals, it has been found that there can be significant leakage between the sealed turbine components when the seal becomes warped and/or gaps develop between the seal and the corners of the turbine components. Moreover, current pressure loaded turbine seals often become unseated from and/or fail to conform to the sealing surfaces of the adjacent turbine components, thereby permitting further leakage between the components.

Accordingly, a seal assembly that minimizes the potential for leakage between adjacent turbine components would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter provides a spring loaded seal assembly for sealing a fluid leakage gap between adjacent turbine components. The seal assembly may generally include a turbine seal and a spring member. The turbine seal may extend between the adjacent turbine components and may be configured to seal the gap defined between the turbine components. The spring member may be configured to maintain the seal in sealing engagement with the adjacent turbine components and may have a width less than the width of the fluid leakage gap.

In another aspect, the present subject matter provides a spring loaded seal assembly for sealing a fluid leakage gap between adjacent turbine components. The seal assembly may generally include a turbine seal and at least one spring member. The turbine seal may extend between aligned seal grooves defined in the adjacent turbine components and may be configured to seal the gap defined between the turbine components. The at least one spring member may be configured to maintain the seal in sealing engagement with the adjacent turbine components. Additionally, the at least one spring member may extend between the aligned seal grooves and may be attached to the turbine seal.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWING

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a spring loaded seal assembly for use between adjacent turbine components. The spring loaded seal assembly may include both a turbine seal and a spring member. Generally, the spring member of the spring loaded seal assembly may be configured to reduce turbine seal leakage by providing a spring seating or biasing force along at least a portion of the length of the seal and at the corners of the adjacent turbine components. This spring seating force or spring loading may be in addition to the pressure loading already present on the turbine seal. Thus, with such loading, the spring loaded seal assembly may ensure that the turbine seal conforms to the seal grooves defined in the adjacent turbine components and, thereby reduce the leakage area. This may improve overall turbine performance by reducing or eliminating many of the problems associated with turbine seal leakage, such as imposing an emissions and performance penalty by limiting the T-fire of a turbine assembly.

Figure 1:
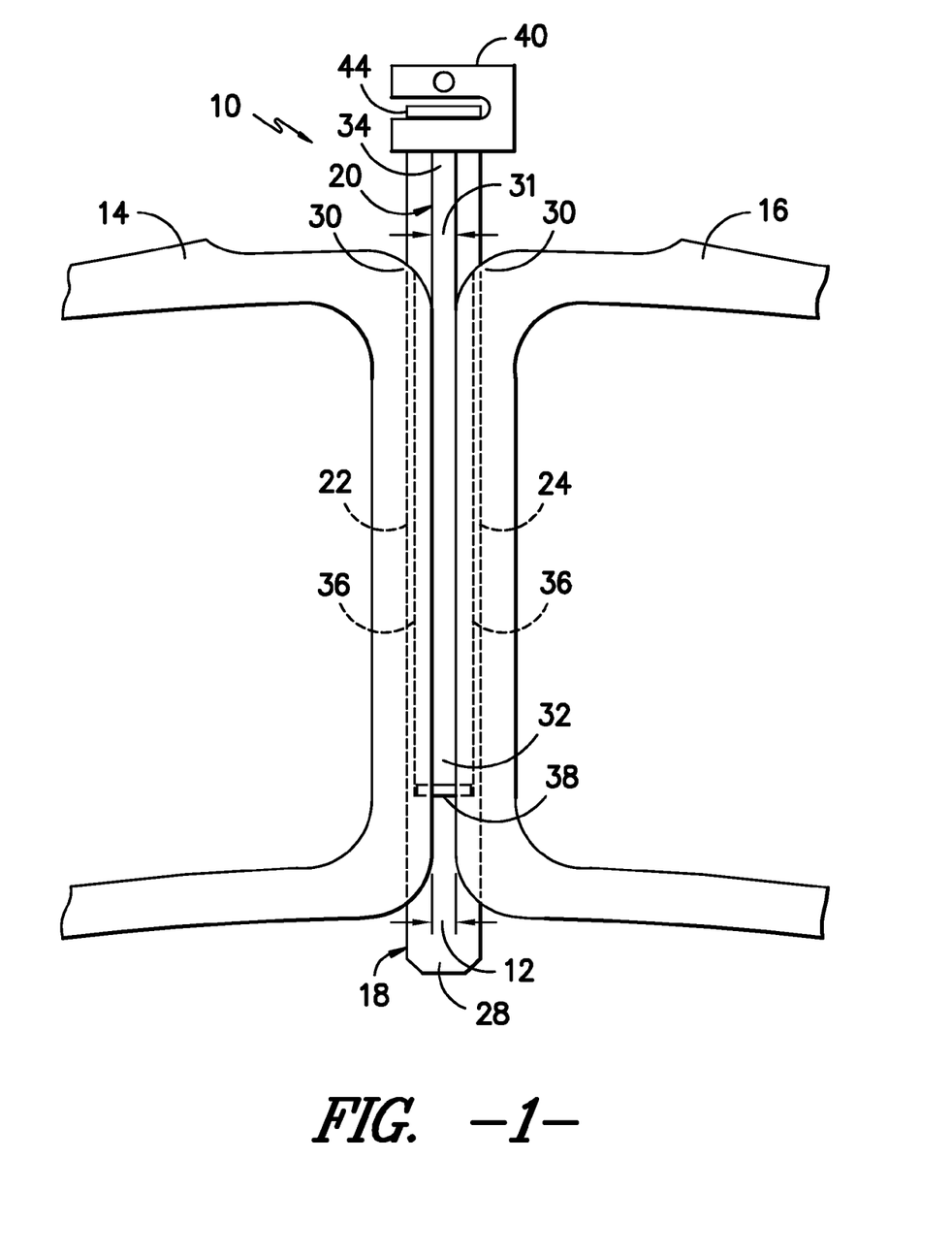
FIG. 1 illustrates a front view of an embodiment of a spring loaded seal assembly installed between adjacent turbine components in accordance with an aspect of the present subject matter.
Figure 2:
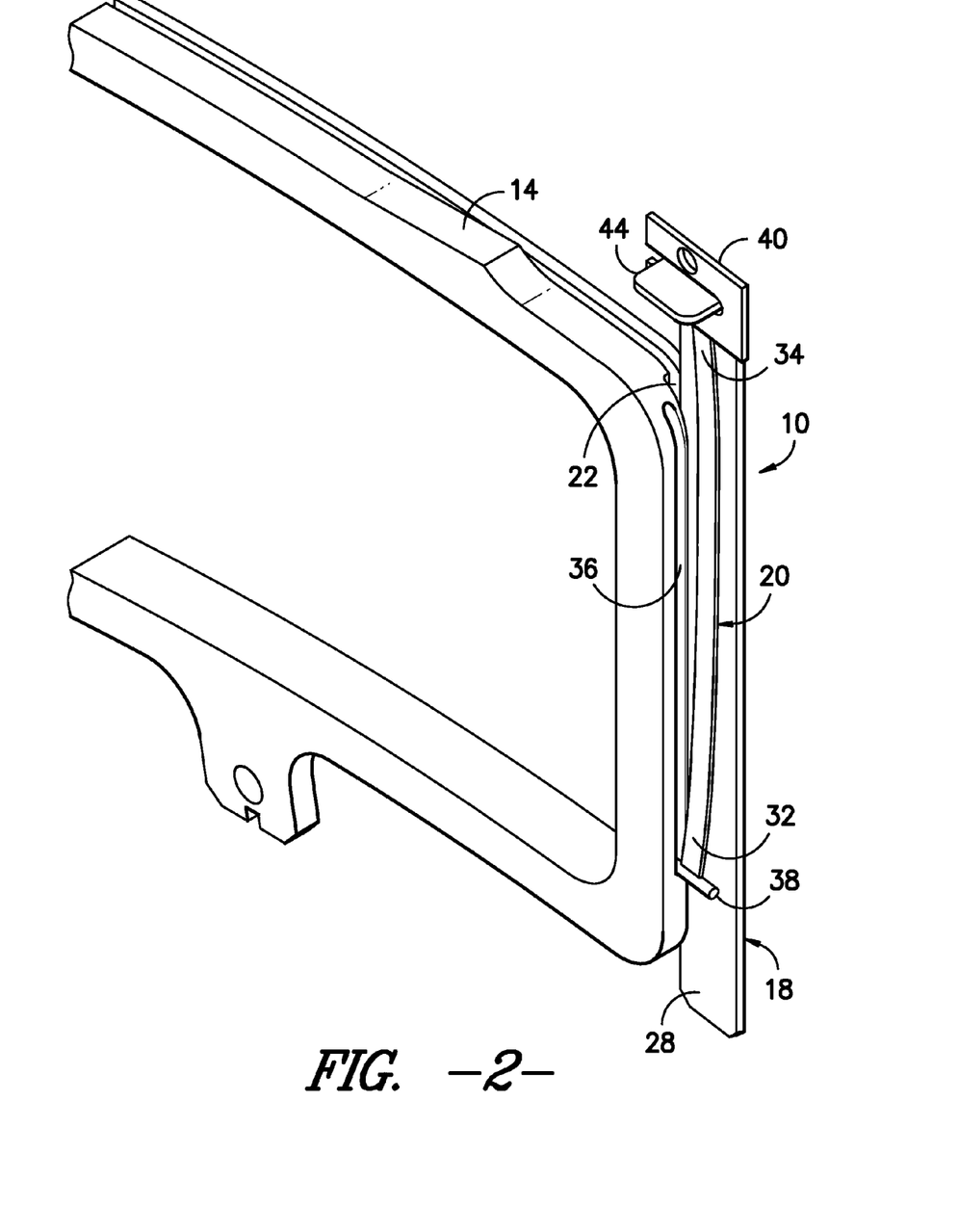
FIG. 2 illustrates a perspective view of the embodiment of the spring loaded seal assembly depicted in FIG. 1 in accordance with an aspect of the present subject matter.
Figure 3:
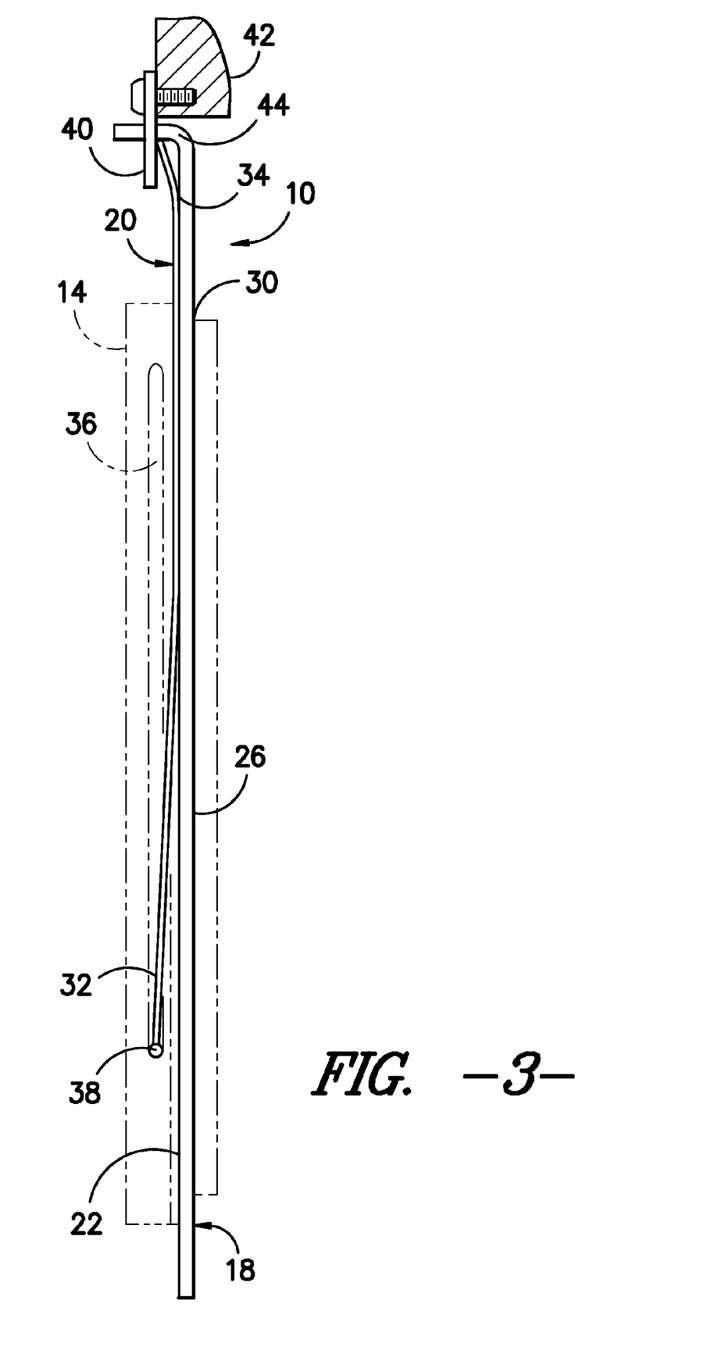
FIG. 3 illustrates a cross-sectional side view of the embodiment of the spring loaded seal assembly depicted in FIG. 1 in accordance with an aspect of the present subject matter.

Referring to the drawings, FIGS. 1-3 illustrate one embodiment of a spring loaded seal assembly 10 for sealing a fluid leakage gap 12 between adjacent turbine components 14,16 in accordance with an aspect of the present subject matter. Particularly, FIG. 1 illustrates a front view of an embodiment of a spring loaded seal assembly 10 installed between adjacent turbine components 14,16. FIG. 2 illustrates a perspective view of the embodiment of the spring loaded seal assembly 10, particularly showing the spring loaded seal assembly 10 with one of the turbine components 14,16 removed for purposes illustration. Finally, FIG. 3 illustrates a cross-sectional, side view of the embodiment of the spring loaded seal assembly 10 as installed between adjacent turbine components 14,16.

The spring loaded seal assembly 10 may include a turbine seal 18 and a spring member 20. The turbine seal 18 may generally extend between the adjacent turbine components 14,16, such as between adjacent stationary or static components, and may be configured to seal a fluid leakage gap 12 defined between the adjacent turbine components 14,16. The spring member 20 may be generally disposed lengthwise along the turbine seal 18. Additionally, the spring member 20 may be configured to maintain the turbine seal 18 in sealing engagement with the adjacent turbine components 14,16 in order to prevent turbine seal leakage through the fluid-path leakage gap 12. One of ordinary skill in the art should appreciate that a fluid-path leakage gap 12 may include, without limitation, a steam-path leakage of a turbine of a steam turbine, a compressed-air leakage gap of a compressor of a gas turbine, and a combustion-gas leakage gap in the combustor of a gas turbine or downstream of the combustor, such as in the transition pieces and/or the first-stage nozzles.

Initially, it should be appreciated that the spring loaded seal assembly 10 of the present subject matter may be utilized to seal any fluid leakage gap 12 generally defined between any adjacent components 14,16 of a turbine assembly. For example, FIG. 1 illustrates a front view of portions of a first turbine component 14 and a second turbine component 16 that may be sealed with the spring loaded seal assembly 10 of the present subject matter. In one embodiment, the first turbine component 14 and the second turbine component 16 may comprise stationary turbine components. The turbine components 14,16 may be disposed substantially proximate to one another so as to define a fluid-leakage gap 12 therebetween. Additionally, the first turbine component 14 may define a first seal groove 22 and the second turbine component 16 may define a second seal groove 24. The first and second seal grooves 22,24 may generally face each other and may be substantially aligned so as to permit a turbine seal 18 to extend between the seal grooves 22,24. It should be appreciated that, in one embodiment, the first and second turbine components 14,16 may comprise circumferentially adjacent transition pieces of a gas turbine. Thus, the spring loaded seal assembly 10 of the present subject matter may be utilized to seal the gap defined between the adjacent exit ends of two transition pieces, such as the adjacent, generally rectilinear aft frames of the transition pieces.

It should also be readily appreciated that the turbine seal 18 of the spring loaded seal assembly 10 may generally comprise any suitable seal known in the art for sealing a fluid leakage gap 12 defined between any adjacent turbine components 14,16. For example, in one embodiment, the turbine seal 18 may comprise a side or spline seal utilized to seal the fluid leakage gap 12 between circumferentially adjacent transition pieces. Thus, one of ordinary skill in the art should appreciate that the turbine seal 18 may comprise a rigid or flexible elongated metallic member extending between the adjacent turbine components 14,16. Alternatively, the turbine seal 18 may comprise a more advanced seal, such as an elongated cloth seal including both metallic cloth and an elongated metal shim. For instance, turbine seals 18 that may be utilized within the scope of the present subject matter include, without limitation, the turbine seals disclosed in U.S. Pat. No. 6,162,014 (Bagepalli et al.) and U.S. Pub. No. 2003/0039542 (Cromer), both of which are assigned to the common assignee. However, it should be appreciated that various other turbine seal types/configurations may be utilized within the scope of the present subject matter.

As indicated above, the turbine seal 18 may generally extend between adjacent turbine components 14,16 so as to seal the gap 12 defined between the adjacent turbine components 14,16. Thus, it should be appreciated that the turbine seal 18 may be configured to be seated against and/or engage the sealing surfaces of the adjacent turbine components 14,16. For example, as shown in FIGS. 1 and 3, the turbine seal 18 may extend between the aligned seal grooves 22,24 of the first and second turbine components 14,16 such that the seal 18 seats against and engages a sealing surface of the seal grooves 22,24, such as an aft surface 26 (FIGS. 3 and 5) of the seal grooves 20,22. It should be appreciated that a high pressure side 28 of the turbine seal 18 may be generally exposed to pressure loading which pushes/presses the turbine seal towards the aft, sealing surfaces 26 of the aligned seal grooves 22,24. For example, in one embodiment, the pressure loading may be due to the pressurized compressor discharge air flowing from the compressor of a gas turbine.

The spring member 20 of the spring loaded seal assembly 10 may generally comprise a separate, backing strip of material configured to provide a spring seating force or spring loading against the turbine seal 18. As shown in FIG. 2, the spring member 20 may generally extend longitudinally along at least a portion of the length of the turbine seal 18. Additionally, in one embodiment, the spring member 20 may comprise a strip of metal having a substantially high yield strength so as to permit the spring member 20 to be spring loaded as it is flexed, bowed or bent against the turbine seal 18 or against the seal grooves 22,24 of the adjacent turbine components 14,16. For example, the spring member 20 may be bowed along its length so as to apply a biasing force or load against an adjacently disposed turbine seal 18 and, thereby, maintain the seal 18 in sealing engagement with the adjacent turbine components 14,16. Thus, in one embodiment, the spring member 20 may comprise an elongated strip of spring steel bowed along its length and having a rectangular cross-section. For instance, the strip of spring steel may be configured as a leaf spring to permit the spring member 20 to be loaded as it is flexed or bowed into an arcuate shape. As used herein, the term leaf spring may include a leaf spring having a single leaf or a leaf spring having multiple leaves, such as two or more leaves. However, it should be appreciated that the spring member 20 may comprise various other flexible materials capable of being bent, bowed, arced and/or flexed so as to provide loading on an adjacently disposed turbine seal 18.

As indicated above, the spring member 20 may be configured to maintain the turbine seal 18 in sealing engagement with the adjacent turbine components 14,16. Thus, in one embodiment, the spring member 20 may maintain the seal 18 in sealing engagement with the sealing surfaces 26 of the turbine components 14,16 by applying a spring seating or biasing force on and/or against the high pressure side 28 of the turbine seal 18. This spring seating force may be due, at least in part, to the mounting configuration of the spring member 20. For example, the spring member 20 may be mounted with respect to the turbine components 14,16 and/or the turbine seal 18 such that it is bowed, bent, arced and/or flexed into biased engagement with the turbine components 14,16 and/or the turbine seal 18. Thus, as a result of this mounting configuration, the spring member 20 may be adapted to apply an even load along the length of the turbine seal 18 (particularly at the interface of the turbine seal 18 and the corners 30 of the turbine components 14,16) to maintain the turbine seal 18 in sealing engagement with the adjacent turbine components 14,16. Additionally, one of ordinary skill in the art should appreciate that, in alternative embodiments, the spring member 20 may be selectively mounted at any location along the turbine seal 18, such as at the corners 30, so as to locally provide a seating force on or against the turbine seal 18.

It should be appreciated that various suitable mounting configurations may be used within the scope of the present subject matter to sufficiently bow/bend/arc/flex or otherwise spring load the spring member 20 such that it applies a spring seating force on or against the turbine seal 18. One embodiment of a spring member 20 and suitable mounting configuration is illustrated in FIGS. 1-3. As shown, the spring member 20 may comprise an elongated strip of material having a width 31 less than the width of the gap 12 defined between the adjacent turbine components 14,16. This narrower width 31 permits the spring member 20 to be mounted exterior of the seal grooves 22,24 and thereby provides significant flexibility with regard to the design of the spring loaded seal assembly 10, such as by allowing a wider range of spacing between the turbine seal 18 and the locations at which the spring member 20 is mounted. Moreover, such exterior mounting allows for smaller seal grooves 22,24, which may provide for less leakage area and better sealing.

Referring to FIGS. 1-3, the spring member 20 may comprise a first end 32 and a second end 34. As shown, the first end 32 may be generally configured to be mounted between the first and second turbine components 14,16. For example, the first and second turbine components 14,16 may define substantially aligned spring grooves 36 configured to slidably receive the first end 32 of the spring member 20. Similarly, the first end 32 of the spring member 20 may include an outwardly extending projection 38 configured to fit within and engage the spring grooves 36. As such, the spring member 20 may be secured between the turbine components 14,16 by sliding the projection 38 of the first end 32 into the spring grooves 36 of the turbine components 14,16. However, it should be appreciated that the first end 32 of the spring member 20 may be mounted or otherwise secured to the first and second turbine components 14,16 or any other turbine component by any suitable means known in the art. For example, the spring member 20 may be welded between the first and second turbine components 14,16 or secured to a mounting device attached to one or both of turbine components 14,16 or to another turbine component. In a further embodiment, the projection 38 may be slidably mounted within the aligned seal grooves 22,24 of the adjacent turbine components 14,16.

The second end 34 of the spring member 20 may generally be mounted and/or disposed in a position that permits the spring member 20 to be bowed/bent/arced/flexed along its length so as to maintain the turbine seal 18 in sealing engagement with the turbine components 14,16. For example, in the embodiment illustrated in FIGS. 1-3, the second end 34 of the spring member 20 may be generally disposed adjacent to a seal mounting bracket 40, such as between the seal mounting bracket 40 and a portion of the turbine seal 18. One of ordinary skill in the art should appreciate that the seal mounting bracket 40 may generally be configured to mount the turbine seal 18 to a third turbine component 42, such as the turbine casing of a turbine assembly. Thus, referring to FIG. 3, the spring member 20 may be loaded or bent/bowed/arced/flexed as the mounting bracket 40 is installed over a mounting tab 44 of the turbine seal 18 and secured to the third turbine component 42. As a result of this loading, the spring member 20 may provide a spring seating force across at least a portion of the turbine seal 18, including loading at the corners 30 of the turbine components 14,16. It should be appreciated, however, that the second end 34 of the spring member 20 need not be mounted and/or disposed adjacent to the seal mounting bracket 40 but may generally be mounted and/or disposed at any location that enables sufficient spring loading to be applied to the turbine seal 18.

Figure 10:
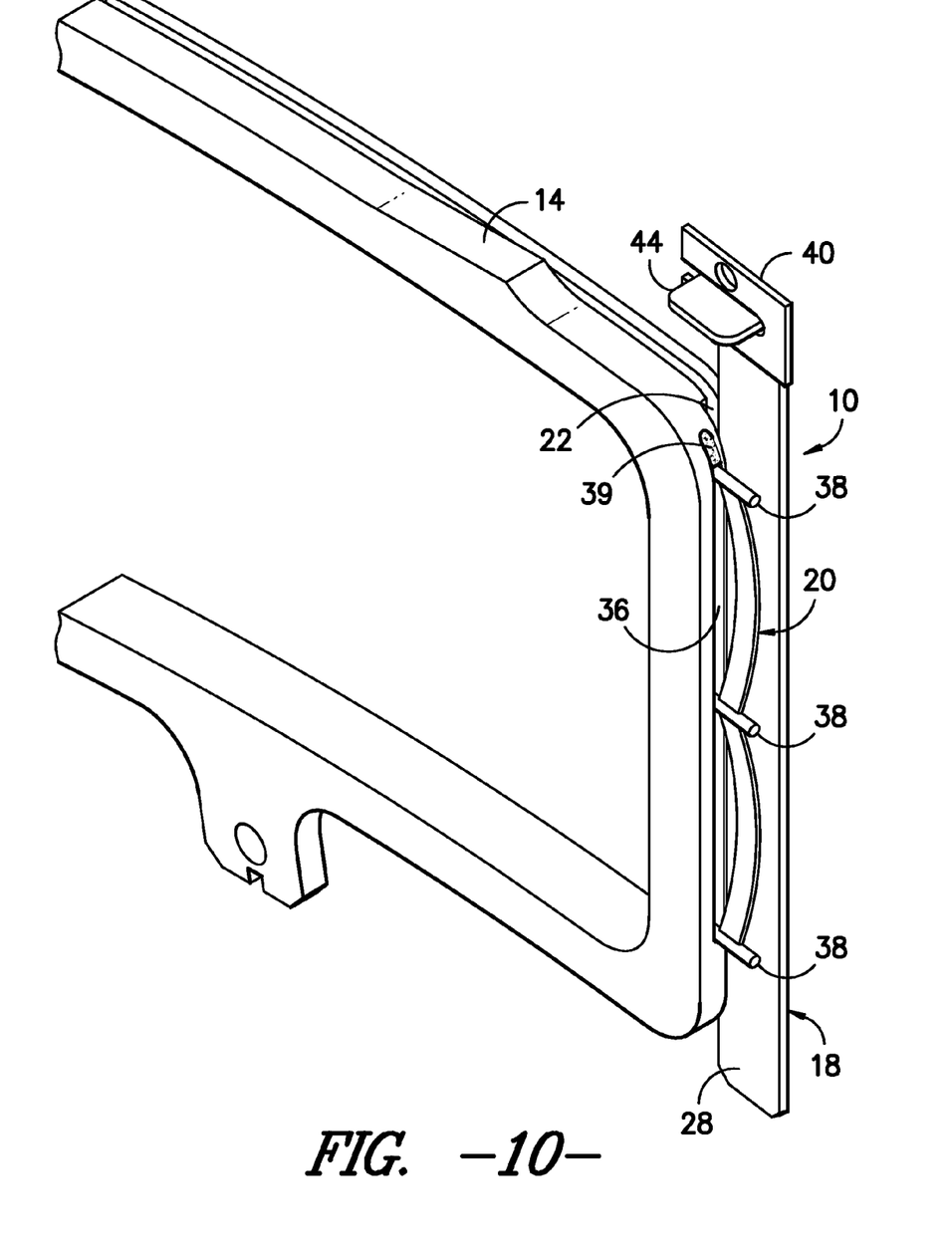
FIG. 10 illustrates a perspective view of another embodiment of a spring loaded seal assembly in accordance with an aspect of the present subject matter.

It should also be appreciated that, in alternative embodiments, the spring member 20 may be mounted within the aligned spring grooves 36 so as to contact the turbine seal 18 at multiple locations along its length. For example, FIG. 10 illustrates a modification of the embodiment of the spring loaded seal assembly 10 depicted in FIGS. 1-3. As shown, the spring member 20 may include multiple projections 38 disposed along its length, with the spring member 20 being bowed between each projection 38. Thus, the spring member 20 may be configured to provide a force or spring loading against the turbine seal 18 at multiple locations along the length of the seal 18. Each projection 38 may be configured to fit within and engage the aligned spring grooves 36. As such, the spring member 20 may be secured between the turbine components 14,16 by sliding each of the projections 38 into the spring grooves 36 of the turbine components 14,16. In one embodiment, an end cap 39 may be disposed at the top of each spring groove 36, such as by weld-filling the tops of the spring grooves 36, to ensure that the spring member 20 remains in place. One of ordinary skill in the art should appreciate that the spacing between the projections 38 may be chosen such that the spring member 20 is sufficiently bowed against the turbine seal 18 between each projection 38.

Figure 4:
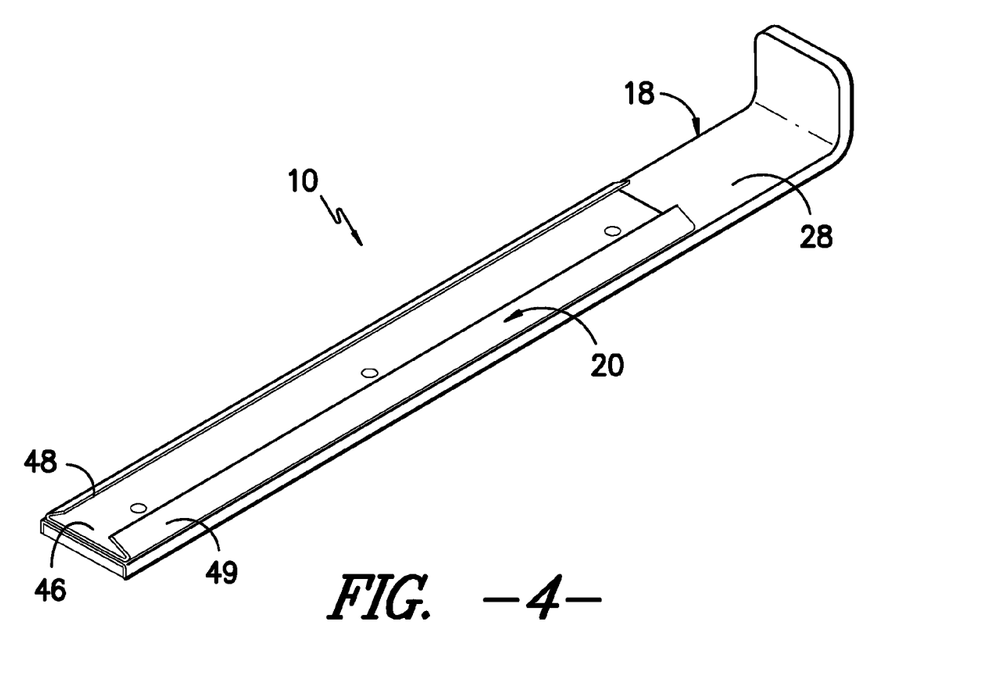
FIG. 4 illustrates a perspective view of another embodiment of a spring loaded seal assembly in accordance with an aspect of the present subject matter.
Figure 5:
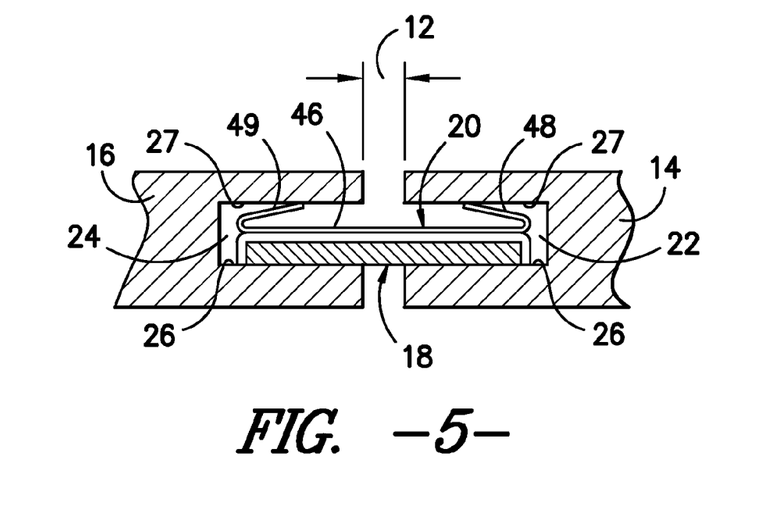
FIG. 5 illustrates a partial plan view of the embodiment of the spring loaded seal assembly depicted in FIG. 4 installed between adjacent turbine components in accordance with an aspect of the present subject matter.

Referring now to FIGS. 4 and 5, another embodiment of a spring loaded seal assembly 10 is illustrated in accordance with an aspect of the present subject matter. Generally, the seal assembly 10 may include a turbine seal 18 and a spring member 20. As particularly shown in FIG. 4, the spring member 20 of the seal assembly 10 may generally comprise an elongated strip of material including a substantially horizontal segment 46 attached to the pressure side 28 of the turbine seal 18 and first and second arms 48,49 extending from the horizontal segment 46.

The horizontal segment 46 may generally be disposed lengthwise and coplanar with the turbine seal 18 so as to extend longitudinally along the length of the turbine seal 18. Additionally, the horizontal segment 46 may be secured to the turbine seal 18 by any suitable means known in the art, such as by welding, riveting, screws, bolts, and the like. The first and second arms 48,49 of the spring member 20 may generally extend away from the horizontal segment 46, such as at an angle. For example, as shown in FIG. 5, the arms 48,49 may extend away from the horizontal segment 46 at an acute angle. Additionally, it should be appreciated that the horizontal segment 46 and the arms 48,49 may be formed from a single strip of material, such as by folding over the sides of the material to form the angled arms 48,49 of the spring member 20.

As indicated above, the spring member 20 may be formed from a flexible, resilient material, such as spring steel. Thus, the arms 48,49 of the spring member 20 may be configured to be flexed or bent as the spring loaded seal assembly 10 is installed between the seal grooves 22,24 of adjacent turbine components 14,16. For example, as shown in FIG. 5, the resilient arms 48,49 may have a particular length and/or may be disposed at particular angle with respect to the horizontal segment 46 such that the arms 48,49 must be flexed, bent inwards or otherwise compressed (i.e. making the angle between the arms and the horizontal segment smaller) as the spring loaded seal assembly 10 is installed. As such, the arms 48, 49 of the spring member 20 may be biased against the pressure or forward surface 27 of the seal grooves 22,24. This bias against the forward surface 27 allows the spring member 20 to apply a force or spring loading against the turbine seal 18 in order to maintain the seal in sealing engagement with the aft sealing surfaces 26 of the seal grooves 22,24.

Figure 6:
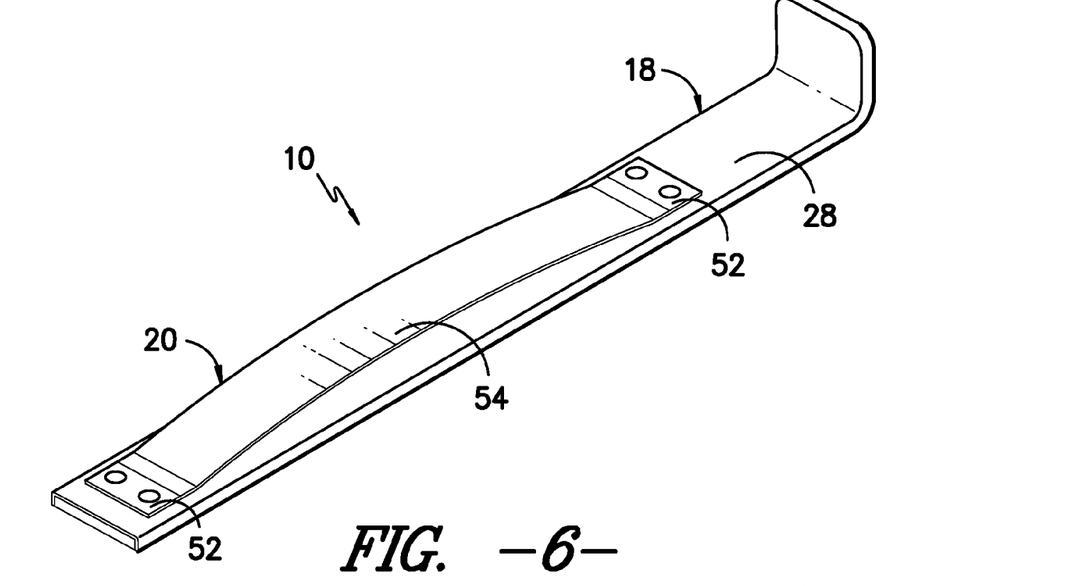
FIG. 6 illustrates a perspective view of a further embodiment of a spring loaded seal assembly in accordance with an aspect of the present subject matter.

Referring now to FIG. 6, a further embodiment of a spring loaded seal assembly 10 is illustrated in accordance with an aspect of the present subject matter. Generally, the seal assembly 10 includes a turbine seal 18 and a spring member 20 As shown, the spring member 20 may comprise an elongated strip of bowed or arced material extending longitudinally along the length of the turbine seal 18. In one embodiment, the spring member 20 may comprise a strip of spring steel bowed along its length and configured as a leaf spring. As such, the spring member 20 may be configured to apply a force or load on the turbine seal 18 as the seal assembly 10 is installed between adjacent turbine components 14,16. For example, the ends 52 of the spring member 20 may be attached or secured to the turbine seal 18 such that a middle portion 54 of the spring member 20 is bowed concavely with respect to the pressure side 28 of the turbine seal 18. It should be appreciated that the ends 52 may be attached to the turbine seal 18 by any suitable means known in the art, such as by welding, riveting, bolts, screws, and the like.

Additionally, the spring member 20 may generally have a width greater than the width of the fluid leakage gap 12 (FIGS. 1 and 5) defined between the adjacent turbine components 14,16. Thus, when the seal assembly 10 is installed, the spring member 20 extends between the seal grooves 22,24 and is biased and/or bowed against the pressure or forward surface 27 (FIG. 5) of the seal grooves 22,24. Specifically, the concave middle portion 54 of the spring member 20 may be compressed within the seal grooves 22,24 due to the height of the arc/bow of the middle portion 54 in relation to the size of the seal grooves 22,24. This compression allows the spring member 20 to apply a force or spring loading against the turbine seal 18, which thereby maintains the seal 18 in sealing engagement with the aft sealing surfaces 26 of the seal grooves 22,24.

Figure 7:
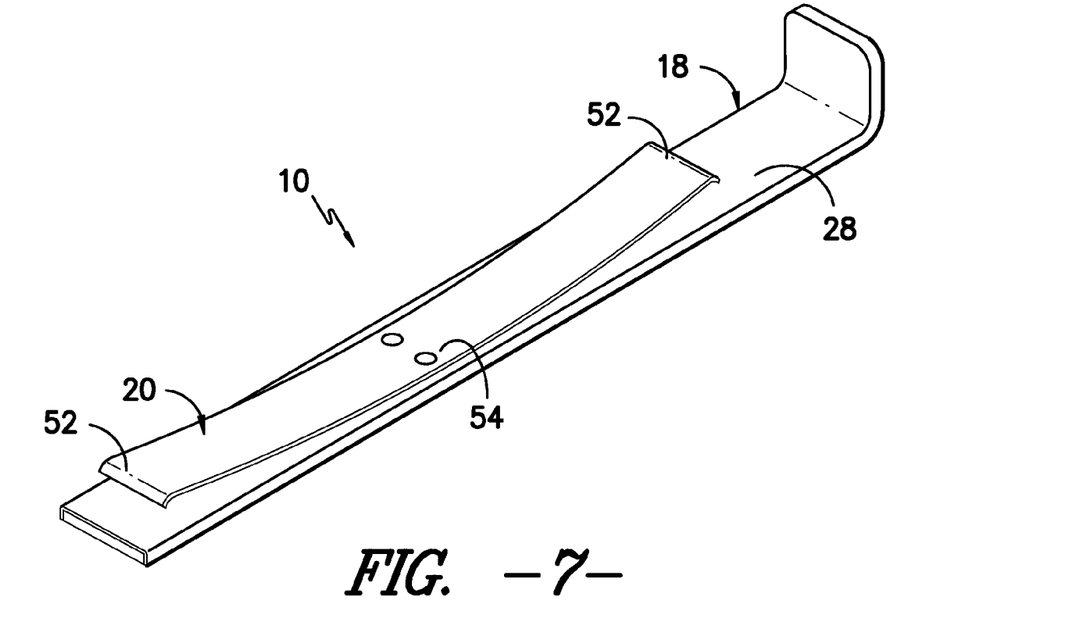
FIG. 7 illustrates a perspective view of yet another embodiment of a spring loaded seal assembly in accordance with an aspect of the present subject matter.

Still another embodiment of a spring loaded seal assembly 10 is illustrated in FIG. 7. The spring loaded seal assembly 10 generally includes a turbine seal 18 and a spring member 20. As shown, the spring member 20 may comprise a separate, elongated strip of bowed or arced material extending longitudinally along the length of the turbine seal 18. In one embodiment, the spring member 20 may comprise a strip of spring steel bowed along its length and configured as a leaf spring. As such, the spring member 20 may be configured to apply a force or load on the turbine seal 18 as the seal assembly 10 is installed in between adjacent turbine components 14,16. For example, the middle portion 54 of the spring member 20 may be attached or secured to the turbine seal 18, with the ends 52 of spring member 20 being bowed convexly with respect to the pressure side 28 of the turbine seal 18. It should be appreciated that the middle portion 54 may be attached to the turbine seal 18 by any suitable means known in the art, such as by welding, riveting, bolts, screws, and the like.

Additionally, the spring member 20 may generally have a width greater than the width of the fluid leakage gap 12 (FIGS. 1 and 5) defined between the adjacent turbine components 14,16. Thus, when the seal assembly 10 is installed, the spring member 20 extends between the seal grooves 22,24 and is biased and/or bowed against the pressure or forward surface 27 (FIG. 5) of the seal grooves 22,24. Specifically, the ends 52 of the spring member 20 may be compressed within the seal grooves 22,24 due to the height of the arc/bow of the ends in relation to the size of the seal grooves 22,24. This compression permits the spring member 20 to apply a force or spring loading against the turbine seal 18, which thereby maintains the seal 18 in sealing engagement with the aft sealing surfaces 26 of the seal grooves 22,24.

Figure 8:
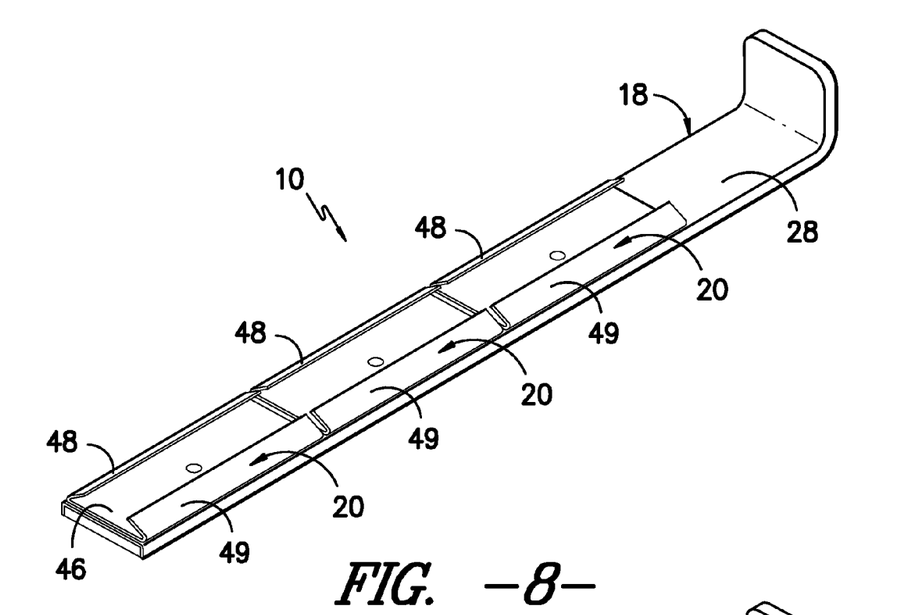
FIG. 8 illustrates a perspective view of still a further embodiment of a spring loaded seal assembly in accordance with an aspect of the present subject matter.

It should also be appreciated that, in alternative embodiments, the spring loaded seal assembly 10 may include more than one spring member 20. For example, a plurality of spring members 20 may be disposed along the length of the turbine seal 18. For instance, FIG. 8 illustrates a modification of the embodiment of the spring loaded seal assembly 10 depicted in FIGS. 4 and 5. As shown, the spring member 20 is segmented along its length so as to form a plurality of individual spring members 20. Accordingly, similar to that described above in reference to FIG. 5, the arms 48, 49 of each spring member 20 may be biased against the pressure or forward surface 27 (FIG. 5) of the seal grooves 22,24 so as to apply a force or spring loading against the turbine seal 18 in order to maintain the seal 18 in sealing engagement with the aft sealing surfaces 26 of the seal grooves 22,24.

Figure 9:
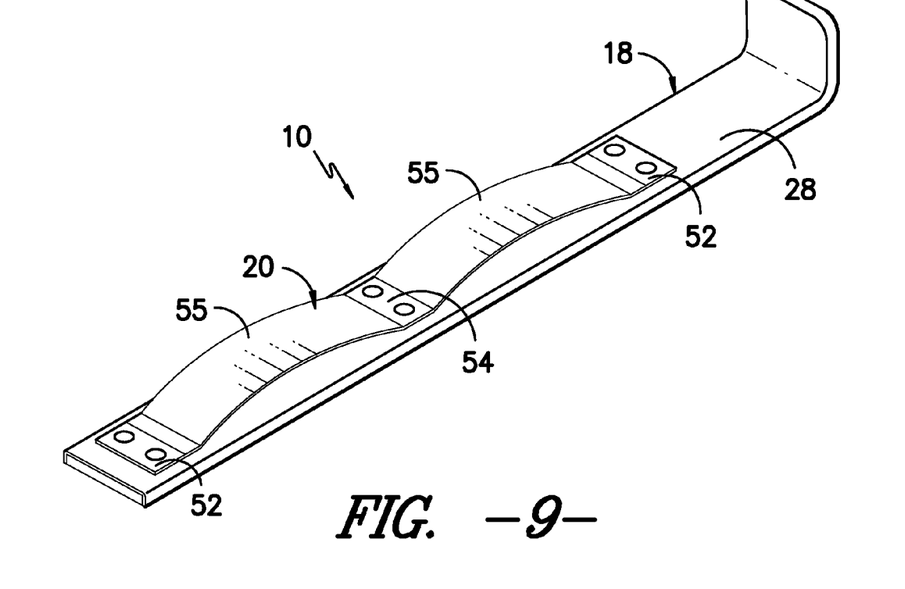
FIG. 9 illustrates a perspective view of still another embodiment of a spring loaded seal assembly in accordance with an aspect of the present subject matter.

Additionally, it should be appreciated that the spring member 20 may be segmented so as to form separate segments within a single spring member 20. For example, a modification of the embodiment of FIG. 6 is illustrated in FIG. 9. As shown, the spring member 20 is secured to the turbine seal 18 at both its ends 52 and at its middle portion 54, such as by welding, riveting, screws, bolts, or the like. Thus, the spring member 20 is segmented into two, concavely bowed segments 55 extending between each end 52 and the middle portion 54 of the spring member 20. It should be appreciated, however, that any number of segments 55 may be formed in the spring member 20 and, thus, the number of segments 44 need not be limited to two. As such, the concave segments 55 of the spring member 20 may be compressed within the seal grooves 22,24 as the spring loaded seal assembly 10 is installed between adjacent turbine components 14,16. This compression allows the spring member 20 to apply a force or spring loading against the turbine seal 18, which thereby maintains the seal 18 in sealing engagement with the aft sealing surfaces 26 of the seal grooves 22,24.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A spring loaded seal assembly for sealing a fluid leakage gap between adjacent turbine components, the spring loaded seal assembly comprising:
    a turbine seal configured to extend within a pair of opposed seal grooves defined by adjacent stationary turbine components, said turbine seal configured to seal a fluid leakage gap defined between said turbine components; and
    a spring member configured to maintain said turbine seal in sealing engagement with a portion of each of said seal grooves, at least a portion of said spring member being received within at least one spring groove defined by at least one of said turbine components,
    wherein said at least one spring groove is spaced apart from said seal grooves.

2. The spring loaded seal assembly of claim 1, wherein said spring member is bowed along its length.

3. The spring loaded seal assembly of claim 2, wherein said spring member is bowed against said turbine seal to maintain said turbine seal in sealing engagement with said portion of each of said seal grooves.

4. The spring loaded seal assembly of claim 1, wherein said spring member is configured to contact said turbine seal at multiple spaced apart locations along the length of said turbine seal.

5. The spring loaded seal assembly of claim 1, wherein said spring member extends longitudinally along the length of said turbine seal.

6. The spring loaded seal assembly of claim 1, wherein said spring member is configured as a leaf spring.

7. The spring loaded seal assembly of claim 1, wherein said spring member does not contact any portion of said seal grooves.

8. The spring loaded seal assembly of claim 1, wherein said at least a portion of said spring member is received within a pair of opposed spring grooves defined by said turbine components.

9. The spring loaded seal assembly of claim 8, wherein said spring member comprises a plurality of projections spaced apart along a length of said spring member, each of said plurality of projections being configured to be received within said spring grooves.

10. The spring loaded seal assembly of claim 8, wherein said spring member comprises a first end, a second end, and a projection extending outwardly from said first, end, said projection being configured to be received within said spring grooves.

11. The spring loaded seal assembly of claim 10, wherein said projection is configured to be slidably received within said spring grooves.

12. The spring loaded seal assembly of claim 10, wherein said projection is the only portion of said spring member that contacts said turbine components.

13. The spring loaded seal assembly of claim 10, wherein said second end is disposed in a position that permits said spring member to be bowed along its length so as to maintain said turbine seal in sealing engagement with said portion of each of said seal grooves.

14. The spring loaded seal assembly of claim 13, wherein said second end of said spring member is disposed substantially adjacent to a bracket configured to mount said turbine seal to a third turbine component.

* * * * *